United States Patent [19]

Gaprindashvili et al.

[11] Patent Number: 4,649,126
[45] Date of Patent: Mar. 10, 1987

[54] GLASS WITH ANIONIC CONDUCTIVITY FOR FLUORINE

[75] Inventors: Khanzerifa I. Gaprindashvili; Vadim E. Kogan, both of Tbilisi; Dzhemal I. Kekelia, Mtskheta; Alexei A. Pronkin, Leningrad; Nana A. Salukvadze; Georgy V. Bakuradze, both of Tbilisi, all of U.S.S.R.; Konstantin K. Evstropiev, deceased, late of Leningrad, U.S.S.R., by Galina I. Evstropieva, Sergei K. Evstropiev, administrators

[73] Assignee: Institut Kibernetiki Akademii Nauk Gruzinskoi SSR, Tbilisi, U.S.S.R.

[21] Appl. No.: 761,586

[22] PCT Filed: Oct. 31, 1983

[86] PCT No.: PCT/SU83/00040
§ 371 Date: Jun. 7, 1985
§ 102(e) Date: Jun. 7, 1985

[87] PCT Pub. No.: WO85/01934
PCT Pub. Date: May 9, 1985

[51] Int. Cl.$^4$ ............................................... C03C 3/23
[52] U.S. Cl. ..................................... 501/43; 204/420; 204/421; 501/49

[58] Field of Search ....................... 501/43, 44, 41, 40, 501/151, 49, 22, 75, 74; 204/420, 421

[56] References Cited

U.S. PATENT DOCUMENTS 2,530,217 11/1950 Bain ........................................ 501/49

FOREIGN PATENT DOCUMENTS 54-31198 10/1979 Japan .................................... 501/151
672161 7/1979 U.S.S.R. .

OTHER PUBLICATIONS

Hagenmuller, P., *Solid Electrolytes* (1978), Academic Press, NYC, pp. 279–280 and 324–325, 327.

*Primary Examiner*—Helen M. McCarthy
*Attorney, Agent, or Firm*—Burgess, Ryan & Wayne

[57] ABSTRACT

The invention relates to halide-containing glass. Glass with anionic conductivity for fluorine comprises PbO, F, and a glass-forming agent. As the glass-forming agent boron oxide ($B_2O_3$) is used, with the following proportions of the components, per cent by mass:
PbO: 86.0 to 87.0
F: 3.5 to 0.5
$B_2O_3$: 10.5 to 12.5

Glass with anionic conductivity for fluorine is intended, mainly, for making dividers of electric signals.

1 Claim, No Drawings

GLASS WITH ANIONIC CONDUCTIVITY FOR FLUORINE

FIELD OF THE INVENTION

The present invention relates to halide-containing glass and, more specifically, it relates to glasses with anionic conductivity for fluorine.

DESCRIPTION OF PRIOR ART

The majority of halide-containing glasses developed hitherto for processes of electric current transfer are characterized by the presence of anions, in particular fluorine ions, and contain, as the glass-forming agent, phosphoric anhydride ($P_2O_5$). Their basic disadvantage resides in the complexity of the glass melting process conditions which requires the use of special crucibles, e.g. made from vitreous carbon and creating a strictly controlled melting atmosphere, e.g. atmosphere of dried argon with the content of oxygen of not more than 0.003% when melting in vitreous carbon crucibles. The melting process can be carried out in platinum crucibles as well, but the latter are destroyed after 2-5 melting cycles.

It is somewhat easier to produce halide-containing glasses in systems containing, as the glass-forming agents, $SiO_2$ and $B_2O_3$. Thus, the synthesis of sodium-boron silicate and sodium borate halide-containing glasses necessitates the use of crucibles of transparent quartz in the atmosphere of nitrogen (gauge pressure 0.3-0.5 atm) or platinum vessels respectively. However, in these systems the predominantly anionic conductivity cannot be ensured due to the presence of alkali ions and high volatility of halogen ions.

Known in the art is alkali-free lead-containing glass incorporating, as the glass-forming oxide, $SiO_2$ which features anionic conductivity for fluorine.

However, this composition has high values of thermal expansion (about $200 \times 10^{-7\circ}$ C.$^{-1}$) which hinders the glass manufacture owing to a high cracking liability of articles during solidification of the melt.

Finally, known in the art are compositions of glasses with anionic conductivity for fluorine, containing PbO, F and, as the glass-forming agent, $SiO_2$. These compositions are melted in corundum crucibles following the conventional process in the glass-making industry.

The compositions contain, percent by mass:
PbO: 80.00 to 81.02
F: 0.76 to 6.15
$SiO_2$: 19.24 to 12.83

They feature good melting properties (melting temperature 750° to 850° C.) and do not crack during solidification of the glass mass, since they have a heat expansion coefficient not exceeding $150 \times 10^{-7\circ}$ C.$^{-1}$). However, variation of volume resistivity of these types of glass by two orders of magnitude simultaneously causes variation of the thermal expansion by $40 \times 10^{-7\circ}$ C.$^{-1}$, thus making impossible the production of matched junctions as a result of their sintering, which hinders, in particular, the manufacture of electric signal dividers with sintered glass blocks.

DESCRIPTION OF THE INVENTION

The present invention is directed to glasses with anionic conductivity for fluorine, which have such a composition that ensures, upon variation of volume resistivity by two orders of magnitude, a difference in the value of the thermal expansion not more than $5 \times 10^{-7\circ}$ C.$^{-1}$.

The object of the present invention is accomplished by providing a glass with anionic conduction for fluorine containing PbO, F and a glass-forming agent. As the glass-forming agent boron oxide is used ($B_2O_3$), with the following proportions of the components, percent by mass:
PbO: 86.0 to 87.0
F: 3.5 to 0.5
$B_2O_3$: 10.5 to 12.5

The advantage of the compositions according to the present invention resides in variation of the value of the heat expansion coefficient by not more than $5 \times 10^{-7\circ}$ C.$^{-1}$ upon variation of the volume resistivity by two orders of magnitude.

PREFERRED EMBODIMENTS

The compositions according to the present invention with anionic conduction for fluorine feature constant (within the range of $5 \times 10^{-7\circ}$ C.$^{-1}$) values of the thermal expansion upon variation of the volume electric resistivity by two orders of magnitude; they contain, percent by mass:
PbO: 86.0 to 87.0
F: 3.5 to 0.5
$B_2O_3$: 10.5 to 12.5

Deviation from the above-specified limits of the content of the components results in a difference in the thermal expansion of glass exceeding $5 \times 10^{-7\circ}$ C.$^{-1}$.

The glass is produced following the technology conventional in the glass-making industry.

For a better understanding of the present invention some specific examples illustrating its embodiments are given hereinbelow:

EXAMPLE 1

A glass with anionic conductivity for fluorine has the following composition, percent by mass:
PbO: 87.0
F: 0.5
$B_2O_3$: 12.5

This glass is produced in the following manner.

A batch was prepared from the starting components which was placed into corundum crucibles. Melting was conducted at the temperature of 700° C. The glass melt is cast into metallic moulds and annealed in a muffle furnace at the temperature of 250° C. for 45 minutes, whereafter the glass is cooled to room temperature. The glass properties are given in the Table hereinbelow.

EXAMPLE 2

A glass with anionic conductivity for fluorine has the following composition, percent by mass:
PbO: 86.5
F: 2.1
$B_2O_3$: 11.4

This glass is prepared following the procedure similar to that described in the foregoing Example 1, except that the melting temperature is 670° C. The glass properties are listed in the Table hereinbelow.

EXAMPLE 3

A glass with anionic conductivity for fluorine has the following composition, percent by mass:
PbO: 86.0
F: 3.5
$B_2O_3$: 10.5

This glass was produced in a manner similar to that described in Examples 1 and 2, except that the smelting temperature was 650° C. The glass properties are presented in the Table hereinbelow.

The properties of glasses produced in the above Examples are given in the Table on the basis of measurements carried out following generally accepted procedures.

TABLE

| Example No | Thermal expansion, $\sigma \times 10^{-7} \,°C.^{-1}$ | Volume resistivity $\rho_{v100°C.}^{at100°C.}$, Ohm · cm |
| --- | --- | --- |
| 1 | 134 | $8.5 \times 10^{11}$ |
| 2 | 134 | $7.1 \times 10^{10}$ |
| 3 | 139 | $5.6 \times 10^{9}$ |

The glasses produced in all the Examples features a constant value of the thermal expansion (within the limits of $5 \times 10^{-7} \,°C.^{-1}$) upon variation of the volume resistivity by two orders of magnitude.

Industrial Applicability

Glass with anionic conductivity for fluorine may be used for making dividers of electric signals, junctions in the production of electrical vacuum devices, electrical insulation engineering, and optics.

What we claim is:

1. Glass having anionic conductivity for fluorine, consisting essentially of in percent by weight;
   PbO, 86.0 to 87.0;
   F, 3.5 to 0.5; and
   $B_2O_3$, 10.5 to 12.5 which glass has a difference in the value of thermal expansion of not more than $5 \times 10^{-7} \,°C.^{-1}$ upon variation of volume resistivity by two orders of magnitude.

* * * * *